US009210149B2

(12) United States Patent
Chang et al.

(10) Patent No.: US 9,210,149 B2
(45) Date of Patent: Dec. 8, 2015

(54) METHOD FOR PUBLICLY PROVIDING PROTECTED ELECTRONIC DOCUMENTS

(75) Inventors: Ho B. Chang, Horw (CH); Klaus Schroeter, Berlin (DE)

(73) Assignee: BioID AG, Sachseln (CH)

( * ) Notice: Subject to any disclaimer, the term of this patent is extended or adjusted under 35 U.S.C. 154(b) by 78 days.

(21) Appl. No.: 14/001,193

(22) PCT Filed: Feb. 24, 2012

(86) PCT No.: PCT/EP2012/053145
§ 371 (c)(1),
(2), (4) Date: Sep. 30, 2013

(87) PCT Pub. No.: WO2012/113901
PCT Pub. Date: Aug. 30, 2012

(65) Prior Publication Data
US 2014/0047507 A1    Feb. 13, 2014

Related U.S. Application Data

(60) Provisional application No. 61/464,008, filed on Feb. 25, 2011.

(51) Int. Cl.
*G06F 7/04* (2006.01)
*H04L 29/06* (2006.01)
*G06F 21/31* (2013.01)
*G06F 21/62* (2013.01)
(52) U.S. Cl.
CPC ............... *H04L 63/08* (2013.01); *G06F 21/31* (2013.01); *G06F 21/6218* (2013.01); *G06F 21/6227* (2013.01)

(58) Field of Classification Search
None
See application file for complete search history.

(56) References Cited

U.S. PATENT DOCUMENTS

| 2005/0162523 | A1   | 7/2005 | Darrell et al. |
| 2006/0072144 | A1 * | 4/2006 | Dowling et al. ............. 358/1.15 |
| 2006/0110011 | A1   | 5/2006 | Cohen et al. |
| 2012/0072723 | A1 * | 3/2012 | Orsini et al. .................. 713/165 |

FOREIGN PATENT DOCUMENTS

WO    WO 2009/108779 A2    9/2009

OTHER PUBLICATIONS

International Search Report of PCT/EP2012/053145, date of mailing Nov. 5, 2012.
International Preliminary Report on Patentability of PCT/EP2012/053145, Aug. 27, 2013.

* cited by examiner

*Primary Examiner* — Brandon Hoffman
(74) *Attorney, Agent, or Firm* — Collard & Roe, P.C.

(57) ABSTRACT

The invention relates to a method for publicly providing protected electronic documents, wherein a first user, after a user authentication process, transmits a private electronic document from a data terminal via a communications network to a private storage medium of a data processing device and stores the document on said medium. Thereafter, an analysis and comparison module is activated, which analyzes and compares the private electronic document to the public electronic documents in a public storage medium, and when a second user accesses the private electronic document of the first user, a public electronic document from the public storage medium is provided by the authentication and access control module instead of the private electronic document.

26 Claims, 3 Drawing Sheets

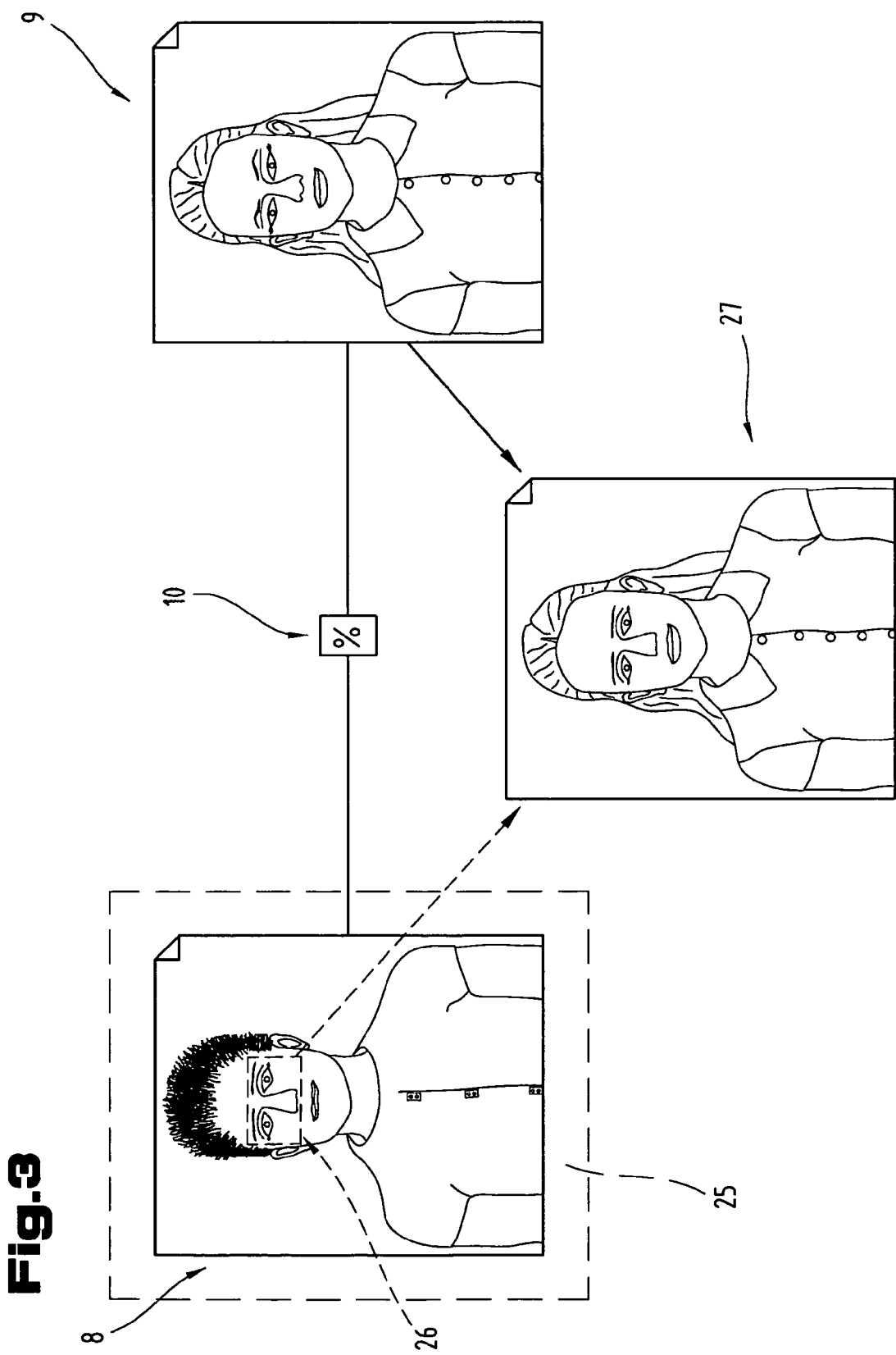

METHOD FOR PUBLICLY PROVIDING PROTECTED ELECTRONIC DOCUMENTS

CROSS REFERENCE TO RELATED APPLICATIONS

This application is the National Stage of PCT/EP2012/053145 filed on Feb. 24, 2012, which claims priority under 35 U.S.C. §119(e) of U.S. Provisional Application Ser. No. 61/464,008 filed on Feb. 25, 2011, the disclosure of which is incorporated by reference. The international application under PCT article 21(2) was not published in English.

The invention relates to a method for publicly providing protected electronic documents.

With the increasing prevalence of communication networks, in particular data communication networks such as for example the internet, a private user is often faced with the problem of making a particular electronic document passively available to a limited or possibly unlimited number of public users. A private user or document provider is defined here as a user who would like to or has to make a particular electronic document available. In contrast a public user or document user is defined as the user group that would like to gain access to an electronic document provided by a private user. In this context the passive provision of a document means that the document provider gives undirected access to the electronic document to a plurality of public users, so that access to the electronic document is initiated by the public user and the private user cannot control or direct access to the document individually.

For safety, data protection and anonymity reasons a private user may not want the provided electronic document to be accessible to all of the mostly anonymous public users. From the prior art a method is known for example in which a public user is identified or authenticated by the private user, after which the private user releases the document to the public user. However, this is associated with a significant amount of administration by the private user, as authorization access has to be granted selectively for each public user.

From the prior art a method is also known in which a public user has to be authenticated by the data processing system to which the private user is also assigned, and accordingly, after a relationship of trust has been established by the data processing system, the public user can access the private, electronic document. The disadvantage of this method is that the private user can only either make the private, electronic document available in its entirety or not make it available at all. A way of making a private, electronic document available is not known from the prior art in which a public user is only granted restricted or partly concealed access to the content of the document without additional administrative effort and without for example additionally prepared versions of the electronic document having to be provided by the private user.

The objective of the invention is therefore to provide a method in which a private user can make a protected and private electronic document available to the public, in which the public cannot infer the actual content of the private electronic document from the electronic document made available. In particular, the objective of the invention is to configure the method such that the private user does not need to perform any additional processing or manipulation steps in relation to the electronic document to be made available.

The objective of the invention is achieved in that a first user establishes a first data connection with a data processing device by means of a data end device through a communication network, the first user carries out a user authentication at an authentication and access control module of the data processing device and then after successful authentication by the authentication and access control module sends a private electronic document via the communication connection from a data end device to a private storage medium of the data processing device and saves it in the latter. By means of these method steps it is ensured that a first user, the private user, is reliably authenticated and therefore is authorized to save a protected, private, electronic document in the private storage medium, in particular in a storage medium assigned clearly to the private user. It is ensured in this way that the saved, private electronic document is only accessible to the first user. The public, i.e. the second user, cannot access the private storage medium of the first user.

The data end device is defined in this connection to be any device in which electronic documents can be saved. In particular, this includes devices for data processing to which a user has direct physical access, such as e.g. a personal computer, or also devices for mobile use which are mostly connected to the communication network via a wireless first data connection. The data end device is however also a device which is not physically accessed directly by the user. For example, the data end device can be a so-called cloud system, accessed by the first user via a data communication connection, and by means of which the private electronic document is transferred to the private data storage medium of the data processing device. Without the direct physical allocation of the user to the data end device a logical allocation is performed by the data-technical communication connection.

An electronic document is defined here to mean any document which can be processed or administered by an electronic data processing device or a data end device, in particular this includes written documents, images, sound and or moving image documents.

The transmission of an electronic document can mean that the document is copied or moved, i.e. the storage relates to the physical entity of the electronic document. However, it is also possible that only one reference to the private electronic document is saved, the physical entity of the private electronic document remains on the data end device of the first user.

A public storage medium is defined as a storage medium which grants access to the saved electronic documents to an unknown and unrestricted public. Public can also mean however that access to electronic documents is granted to a restricted and thereby mostly known user group. For example, the method according to the invention can be used for a closed group, where said group is formed by members of an association. The public data storage medium is then accessible to all of the users in this group, and users outside the group have no access.

In the following method steps an analysis and comparison module is activated which has access to a public storage medium via a second data connection, in which public storage medium a plurality of public electronic documents are saved. By means of the analysis and comparison module the private electronic document and the public electronic documents are analyzed and compared and for each comparison a degree of matching is determined. Said method steps according to the invention ensure that of the public electronic documents saved in the public storage medium for each public document or a subset of public documents information about similarity is established. This is performed by the analysis and comparison module without the private user having to process the provided, private electronic document in any way.

If a second user tries to access the private electronic document of the first user by means of the authentication and access control module a public electronic document is made available from the public storage medium instead of the private electronic document. In this way it is ensured that a second public user is provided with a document which corresponds to the protected private electronic document saved by the first user with the defined degree of matching. The security of the private electronic document is ensured in that the content of the private electronic document is not made available to the public, but a public document is provided which is similar to the private documenter with the defined degree of matching.

In one development the previously determined degree of matching of a public electronic document with the private electronic document is transmitted together with the public electronic document. This development has the advantage that the public user is informed directly with the transmitted public document how far the provided document corresponds with the private document.

The development in which by means of the analysis and comparison module a reference to the public document is saved together with the transmitted degree of matching in the private storage medium has the advantage that during the access of the second user direct access can be provided to the saved data, i.e. no access to an external storage medium is necessary, which results in an increase in the access speed and simplified management.

According to one development the analysis and comparison module provides the first user at a user interface with a selection of analyzed and compared public electronic documents together with the degree of matching and possibly the private electronic document to choose from. As it is possible that a plurality of documents are saved in the public storage medium which are similar to the private electronic document saved in the private storage medium and thus there is a degree of matching, this development has the advantage that the private user has an overview from the user interface of the public documents and the defined degree of matching and then can specifically select the document or documents to which a second public user can gain access when trying to access the private document. The user interface is provided for this on the data end device of the first user, so that the first user can perform the method steps of saving the private electronic document and then selecting the provided, public document via the communication network.

According to one development an access authorization hierarchy is stored in the authentication and access control module for the second user, which is shown to the first user at the user interface for individual configuration. In this way the first user can determine individually for a second user which of possibly a plurality of possible public documents should be made available to the user. Furthermore, it is also possible to determine whether the degree of matching should be made available to the second user. Likewise by means of this development it is possible to determine for individual second users whether the public electronic document or the private electronic document should be made available. This is an advantage particularly if there are several second users who are assigned different levels of trust. In this way the first user can provide trustworthy second users with a public document that has a higher degree of matching, general second users can access a public document a lower degree of matching.

One development, in which a selection of electronic documents from the public storage medium and/or their respective degrees of matching are provided for the second user, has the advantage that the second user gets more information about the saved, private electronic document without making details of the private electronic document public. The selection, which can be made for example by means of a user interface, allows the second user to receive the provided documents and their degrees of matching, in order in this way to acquire a better view of the basic private electronic document.

To simplify and optimize the method according to the invention it is an advantage if the defined degrees of matching are analyzed by the analysis and comparison module and an electronic document is provided to the second user from the public storage medium with a degree of matching of which is above or below a certain threshold. By determining a threshold it is possible to ensure that only a public, electronic document is provided which coincides with the private electronic document at least to a minimum degree. In this case the provided public document should correspond mostly with the private, electronic document. According to one development however it is also possible that the degree of matching lies below a threshold, whereby in this case the content of the saved, private, electronic document should be concealed as effectively as possible. In particular, by saving a plurality of thresholds different levels of availability can be provided so that it is possible for the first user at any time to change the degree of similarity with the provided public documents.

To simplify the method according to the invention for the first user a development is advantageous in which the defined degrees of matching are analyzed by the analysis and comparison module and the public electronic document with the highest degree of matching is made available to the second user. After saving the private electronic document in the private storage medium according to the development the particular public electronic document is provided automatically which corresponds as far as possible to the private electronic document. In this way the first user does not need to go to any additional trouble to protect his own private electronic document.

To restrict the number of people that can access the private, electronic document one development is advantageous in which the second user carries out a user authentication at the authentication and access control module. In this way it is possible to determine that only a restricted number of people can gain access to the private electronic document of the first user. In one development it is also possible for example that a public document with a lower degree of matching is made available to non-authenticated second users, whereas its authenticated second users can be provided with a public document with a higher degree of matching, as it can mostly be assumed that with user authentication generally a certain degree of identity security is ensured. By means of this development also individual levels of access can be established, in which a saved access authorization profile is verified during the user authentication. The first user can determine by means of this access authorization profile for each individual second user, or for one or more groups of second users, which degree of matching should be applied when making the public electronic document available.

Electronic documents can be for example image documents, in particular facial images. Therefore, according to one development it is an advantage if by means of the analysis and comparison module the analysis is performed on the basis of guidelines for documents using image pattern recognition methods, in particular according to the ICAO guidelines for travel documents. The ICAO has defined clear and in particular internationally valid rules for analyzing and clearly comparing images of human faces. By means of this development it is possible in particular that the first user saves an image of his face as a private, electronic document and by means of the method according to the invention a second user is provided with a facial image which is saved in a public storage medium, wherein by providing a degree of matching the second user can determine how far the represented facial image corresponds to the facial image of the first user.

The private, electronic document can however also be a general written document so that it is advantage if according to one development the analysis is performed by the analysis and comparison module on the basis of an extended checksum formation. The checksum formation can be performed for example by means of an adapted, known hash algorithm, whereby the extension is in the fact that by means of the defined checksum it is possible to partly determine the underlying electronic document.

The private, electronic document can however also relate to sound documents, in particular voice recordings. In order to be able to compare such documents with one another it is an advantage if the analysis is performed by the analysis and comparison module on the basis of a formant analysis. In a formant analysis the characteristic resonance frequencies are determined which are assigned explicitly and without falsification to one person, as said resonance frequencies are determined by the physical characteristics of the voice of the person. By means of this development it is possible to provide the second user with a voice pattern which corresponds to the voice of the first person with the degree of matching.

In a further development iris recognition is performed by the analysis and comparison module. The iris is defined explicitly as a biometric feature of a person so that by means of this development a biometric identification is also possible with the defined degree of matching.

It is also possible to analyze a determined movement pattern of a person by means of the analysis and comparison module.

The degree of matching can be defined in a scale, however it is possible according to one development to determine the degree of matching as a multidimensional value field. This development has the advantage that for one electronic document a plurality of characteristics can be determined during the analysis, whereby a more individual comparison of the public and the private document is possible. By way of the example of a facial analysis a degree of matching can be determined respectively for the facial shape, the eye area, the mouth area etc. In this way the second user can assess more accurately by evaluating the multidimensional degree of matching, how far the provided, public, electronic document corresponds with the private, electronic document.

An electronic document can also comprise a plurality of sections, where information of varying sensitivity can be included in the individual sections. Information that is not sensitive can therefore be made public without any concern, whereas sensitive information can only be made public by means of a similar, electronic document. Therefore, according to one development during the provision of the public electronic document, at least one section of the public electronic document is replaced by a section of the private electronic document. In this way an electronic document is provided for the second user which coincides with a degree of matching to the private electronic document, which however also coincides exactly in at least one section with the private, electronic document. In a written document the substituted section could for example relate to a document title or summary, in an image document the eye area could be substituted for example.

According to one development it is also possible for the public electronic document to be formed so that at least one section of the private electronic document is replaced by a section of the public electronic document. This development corresponds to the preceding development but the starting document and target document are interchanged.

For the previous developments a further development is advantageous in which the first user determines at a user interface of the analysis and comparison module at least one section in the private electronic document. In this way the first user can determine specifically what information should be provided unchanged from the private electronic document for the second user, whereas the rest of the private, electronic document is replaced by a public, electronic document. After saving the first electronic document a summarizing image is shown to the first user at the user interface, whereupon the first user can determine the section or those sections which are to be left unchanged. Accordingly this development is applied to cases where a section of the private electronic document is replaced by a section of the public electronic document.

According to one development the first user determines the level of substitution at the user interface of the analysis and comparison module. In addition to the complete substitution of one section of an electronic document it is also possible to make an adjusted substitution, in that one section or the entire image is replaced or merged with the indicated level of substitution. This is known for example as morphing in the case of image data as electronic documents. In this way it can be established how far the document to be substituted should be influenced by the substituting document.

To simplify the provision of the documents one development is advantageous in which the public electronic document is transmitted into an intermediate storage medium of the data processing device. As when providing a public electronic document access is mostly made to a data processing system, which is not under the control of the method according to the invention, the quality of the provision is not ensured. By means of this development the security of the provision is therefore improved.

If the public electronic document is transmitted to the private storage medium this has the advantage that in this way also the substitution document is arranged within the access management of the first user and thus there is generally a clear extension of the individual influence of the provision, in particular in relation to the second user.

The objective of the invention is also achieved by means of a device for performing the method according to the invention. The device comprises a data processing device, an authentication and access control module, an analysis and comparison module and a private storage medium, wherein a public storage medium is connected by data technology to the data processing device, and in that also in the private storage medium at least one private electronic document is saved and in that in the public storage medium a plurality of public electronic documents are saved.

The division according to the invention into a private and public storage medium can be achieved for example in that two physically separate storage media, in particular database systems, are provided. According to one development however it is also possible that the private and the public storage medium are arranged in a common database system. Database systems (DBMS) are configured to make a plurality of separate storage media available in a common, physical management system. Together with the authentication and access control module it can be ensured reliably for the first and second user that access is provided to a different storage medium and mainly that the second user cannot gain direct access to the private storage medium and the private electronic documents stored in the latter.

A development is also advantageous in which the public storage medium is connected by an additional data connection via the communication network to the data processing device by data technology, as in this way any public data memory can be used for the method according to the invention. In particular, it is also possible in this way that the first user can use individually a specific, public storage medium for each provided electronic document. As the additional data connection is formed by the communication network, in this way each public storage medium that is connected to the communication network can be used for the method according to the invention.

It is also an advantage, if the communication network is formed by a public data communication network, in particular an unsecured communication network such as the internet, as it is ensured in this way that the first user and in particular a plurality of second users have access to the communication network and thus to the private electronic document saved by the first user or the provided, public electronic document. The method according to the invention thus has the particular advantage that even with a public and in particular unsecured communication network private and sensitive data of a first user can be provided, whereby the first user can be certain that the protected, private electronic document will not be disseminated in an uncontrolled manner, that the second user is still able by means of the provided public document together with the degree of matching to obtain a view of the contents of the private, electronic document.

One development in which the analysis and comparison module and the private storage medium form a safety zone has the advantage that the components which relate to saving, analysis and access management to the private storage space can be configured to be particularly secure, for example, said components can be arranged in a structurally-technically particularly secure environment. As the second user is only provided with a publicly available document, but has no direct access to the saved, private electronic document of the first user, by means of the development according to the invention, it can be ensured in addition that the unpermitted access of the second user to the private storage medium of the first user is impossible. For example, the safety zone can be formed by a separate section in a data center, however also a spatial and/or structural separation of public areas is possible.

For a better understanding of the invention the latter is explained in more detail with reference to the following Figures.

In a much simplified representation respectively:

FIG. 3 shows a schematic representation of the possible formation of a prepared electronic document.

FIG. 1 shows a schematic representation of a system for performing the method according to the invention, and the essential method steps are indicated.

Figure 1:
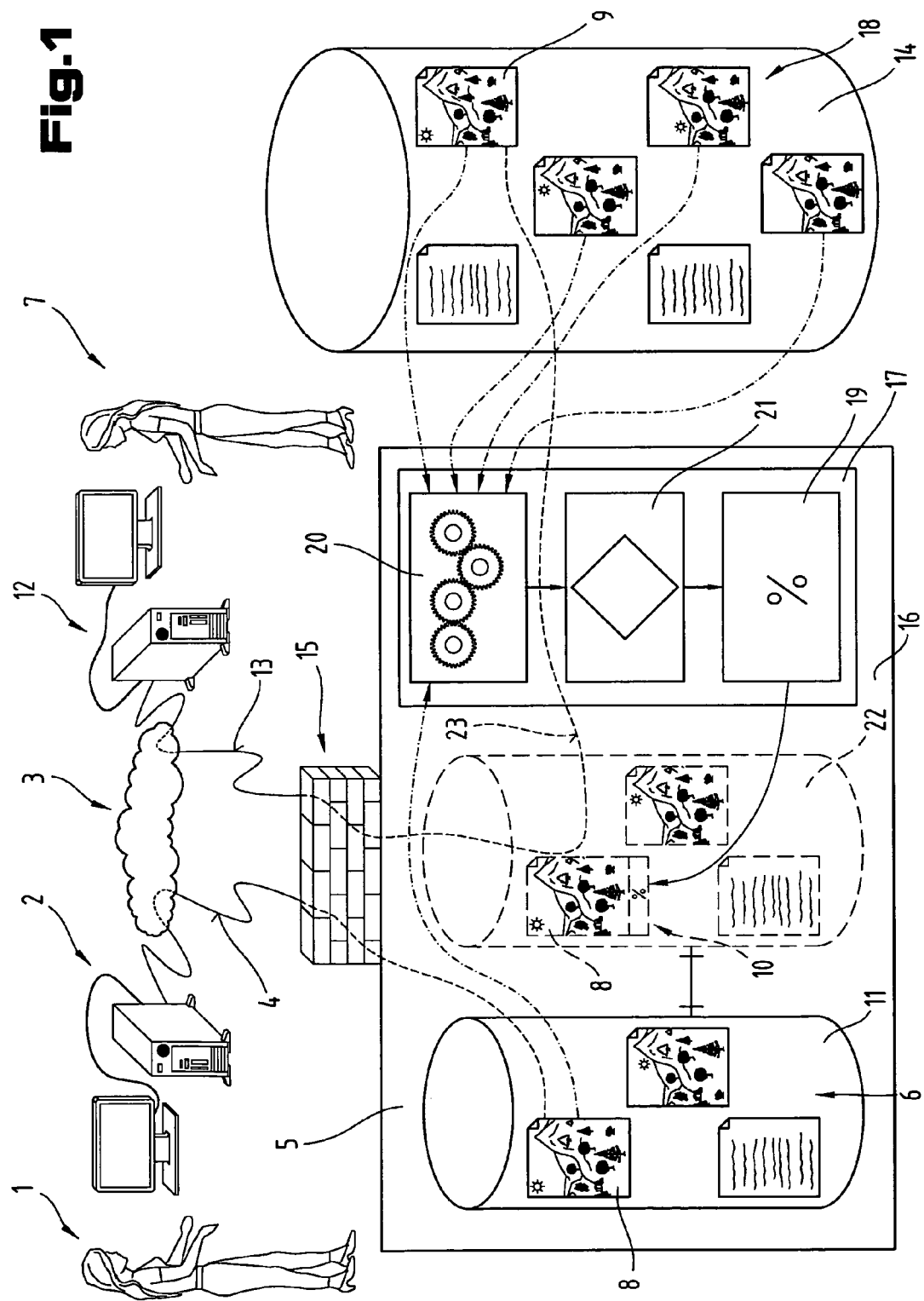
FIG. 1 shows a configuration of a system for performing the method according to the invention.

The invention concerns a method in which a first user 1 establishes by means of a first data end device 2 via a public communication network 3 a first data connection 4 with a data processing device 5. The first user 1 would like to make private electronic documents 6 available to a public, second user 7, where this provision is to be performed such that the second user 7 is not provided with a specific, private electronic document 8, but with a public electronic document 9 and if necessary the degree of matching 10 of the latter.

By means of the method according to the invention or the device according to the invention this is achieved in that the first user 1 saves an electronic document in a private data memory 11 via a first data end device through the first data connection 4 produced with the data processing device 5, wherein a plurality of private electronic documents 6 can be saved in said private data memory 11. The private data memory 11 is configured for example as a database in a database management system and ensures via an access control, that only the authorized first user 1 has access to the saved, private electronic documents 6.

A second user 7, who establishes by means of a second data end device 12 via the public communication network 3 a second data connection 13 to the data processing device 5, does not gain access to the private, electronic document 8, but according to the invention is provided with a public, electronic document 9 from a public storage medium 14. The regulation and control of the access of the first 1 and second 7 user to the private 11 and public 14 storage medium is controlled by the authentication and access control module 15. The authentication and access control module 15 includes all of the components of a data processing device 5 that manage and regulate the access authorizations of the individual users, provide the electronic documents without the intervention of the user and in particular manage the communication of the individual modules within a safety zone 16 and the communication with modules outside the safety zone 16. The data processing device 5 can be formed for example by a webserver with connected application server, wherein the authentication and access control module 15 is formed by the server components. To simplify the description in the following the authentication and access control module is denoted as an implementing module for the document provision, wherein however the provision of the documents is mostly performed by the webserver or application server, however the access control is subject to the authentication and access control module 15.

According to the invention an analysis and comparison module 17 is used to analyze and compare a private, electronic document 8 with a plurality of public electronic documents 18, wherein the analysis and comparison operation is such that a degree of matching 19 between the electronic documents is determined. For the private, electronic document 8 to be analyzed public electronic documents 18 saved in the public storage medium 14 are analyzed with respect to the characteristics of their contents and compared with the starting document. In the case of image documents, in particular facial images, the analysis can be performed on the basis of guidelines which are used in accordance with internationally recognized standards for automatic face recognition, for example the analysis can be performed according to ICAO guidelines. In this case by means of a data preparation module 20 characteristic features are searched for in the electronic documents, for example the head shape, distance between the eyes and defined spacings within the facial geometry are determined from the electronic document, whereby a suitable data preparation is necessary for performing the subsequent comparison, in particular a graduation of the image data. For electronic documents with an audio content the so-called formants are determined by means of a frequency analysis in order to perform the comparison of the electronic documents afterwards.

After the data preparation the prepared data 21 are compared. If for the analysis of the electronic documents a recognized and in particular widely used standard has been used the results obtained therefrom can be compared with one another very easily, and thus indicate a degree of matching 19 between the private, electronic document 8 and a public electronic document 18 respectively. FIG. 1 shows schematically that in an intermediate storage medium 22 for the private electronic document 8 a reference 23 to the public, electronic document 9 and the degree of matching 10 determined for this public document 9 is saved. According to the invention however also for a private electronic document a plurality of public electronic documents can be saved or assigned thereto, so that in the intermediate storage medium 22 a corresponding number of references or degrees of matching are saved. The intermediate storage medium can be configured to be independent, however it is also possible according to the invention that the latter is integrated into the private storage medium 11.

When the second user 7 tries to access the private electronic document 8 of the first user 1 and the second user 7 logs into the authentication and access control module 15, the latter determines that the second user 7 may not have access to the private electronic document 8, but the request for access is directed according to the saved reference 23 to the public electronic document 9 or said public electronic document 9 is made available to the second user 7. If necessary, the established degree of matching 10 is also made available to the second user 7, so that the second user receives an indication that the requested, private electronic document has not been provided but rather a substitute document has been provided which corresponds with the original document to a certain extent. When saving the private electronic document 8 in the private storage medium 11 the first user needs to determine whether the second user 7 will be shown the defined degree of matching at the time of access, or in the case of a plurality of public electronic documents 18 which public electronic document or documents will be made available to the second user.

In the configuration shown in FIG. 1 the public electronic documents 18 remain saved in the public storage medium 15, when the second user 7 tries to access the private electronic document 8 of the first user 1 only a reference 23 to the public, electronic document 9 is sent or the public electronic document 9 is picked up from the public storage medium 14 by the data processing device 5 and made available to the second user 7 or its second data end device 12 via the second data connection 13.

Figure 2:
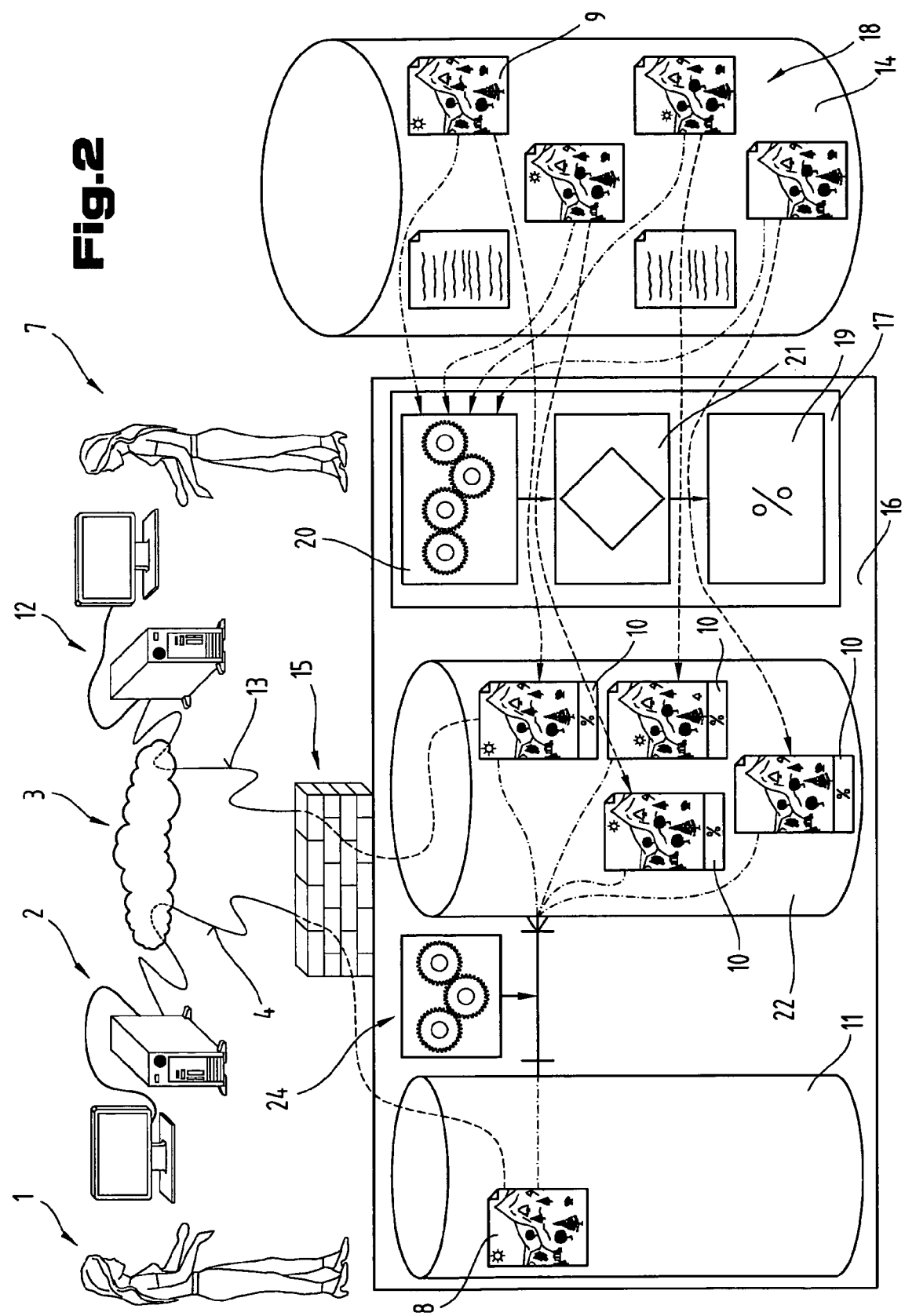
FIG. 2 shows a further possible configuration of a system for performing the method according to the invention.

FIG. 2 shows a further possible configuration of the device according to the invention in which the substitute documents can be sent from the public storage medium 14 into the private storage medium 11 or into the intermediate storage medium 22. To simplify the representation the process is only shown for a private, electronic document 8, furthermore the private storage medium 11 and the intermediate storage medium 22 are shown separately, however according to the invention these two storage media can also be arranged to be integrated. However, the main difference from the configuration shown in FIG. 1 is that the electronic substitute documents are now saved within the safety zone 16 in a storage medium, and thus are fully subject to the control of the data processing device 5 or the authentication and control module 15.

At the time of access of the second user 7 the latter is provided with one of the public documents 9 saved for this document instead of the private electronic document 8, wherein the selection of the document to be made available can be saved by first user when saving the private electronic document 8 in the private storage medium 11 in an allocation table in an allocation selection module 24. In particular, the first user can determine whether, with the existence of a plurality of possible public electronic documents 9, the second user 7 can be provided with one or more of these documents, and furthermore, whether the degree of matching 10 should be made available to the second user 7.

FIG. 3 shows a further possible configuration of the method according to the invention in which in the electronic document made available to the second user at least one section of the public, electronic document is replaced by a section of the private, electronic document or vice versa, in that a section of the private electronic document is replaced by a section of the public, electronic document.

FIG. 3 shows the case in which one section of the public document is replaced by a section of the private document. On performing the analysis and comparison of the electronic documents the first user is shown on a user interface 25 the saved, private electronic document 8 and in this representation can determine a section 26 which is to be shown unchanged or unsubstituted in the electronic document 27 made available to the second user. For the image data shown in FIG. 3 as electronic documents this has the advantage that the first user can conceal his image by disclosing an unchanged section but can disclose a portion of his actual image. In the case of written documents the section to be made available can consist of the title or a summary for example, the remaining content of the written document can be remain hidden from the second user as the content of the public electronic document is provided for the latter.

During the access of the second user to the private electronic document of the first user by means of the method according to the invention an electronic document 27 is made available which generates the content of the public electronic document 9 with a specific degree of matching 10 and in addition one section 26 of the private, electronic document 8 overlayers this generated document, such that the latter replaces the relevant section of the public, electronic document. In the case of image data it is necessary for example to have a graduation of the image data in order to obtain a suitable covering of the substituted section with the underlying section. On the analysis of the provided, electronic document 27 by the second user the latter should however not be able to determine the original document 8 from the provided document, even when taking into account the degree of matching 10.

In one development a plurality of sections 26 can also be provided, wherein the first user in particular can determine individually by the configuration of the authentication and access control modules, which second user or which second user group can be provided with which version of the electronic document 27.

Lastly, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position. Furthermore, also individual features or combinations of features from the various exemplary embodiments shown and described can represent in themselves independent or inventive solutions.

All of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

The exemplary embodiments show possible embodiment variants of the method for publicly providing protected electronic documents, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field. Thus all conceivable embodiment variants, which are made possible by combining individual details of the embodiment variants shown and described, are also covered by the scope of protection.

FIG. 2 shows a further and possibly independent embodiment of the system for performing the method, wherein for the same parts the same reference numerals and components names have been used as in the preceding Figures. To avoid unnecessary repetition reference is made to the detailed description relating to the preceding FIG. 1.

Lastly, as a point of formality it should be noted that for a better understanding of the structure of the system for performing the method for publicly providing protected electronic documents the latter and its components have not been represented to scale in part and/or have been enlarged or reduced in size.

The underlying problem addressed by the independent solutions according to the invention can be taken from the description.

In particular, the individual embodiments shown in the Figures can form the subject matter of independent solutions according to the invention. The problems and solutions according to the invention can be taken from the detailed descriptions of said Figures.

LIST OF REFERENCE NUMERALS

1 First user
2 First data end device
3 Communication network
4 First data connection
5 Data processing device
6 Private electronic documents
7 Second user
8 Private electronic document
9 Public electronic document
10 Degree of matching
11 Private storage medium
12 Second data end device
13 Second data connection
14 Public storage medium
15 Authentication and access control module
16 Safety zone
17 Analysis and comparison module
18 Public electronic documents
19 Degree of matching
20 Data processing module
21 Comparison module
22 Intermediate storage medium
23 Reference
24 Allocation selection module
25 User interface
26 Section
27 Provided electronic document

The invention claimed is:

1. A method for publicly providing protected electronic documents, wherein:
   a first user using a data end device establishes a first data connection between the data end device and a data processing device via a communication network;
   the first user performs a user authentication at an authentication and access control module of the data processing device;
   the first user, after completing the authentication by the authentication and access control module, transfers a private electronic document via the first data connection from the data end device to a private storage medium of the data processing device and saves the private electronic document in the private storage medium;
   an analysis and comparison module is activated, the analysis and comparison module having access to a public storage medium via a second data connection, a plurality of public electronic documents being saved in the public storage medium;
   via the analysis and comparison module the private electronic document is analyzed and compared with the public electronic documents and for each comparison a degree of matching is determined; and
   during an attempt of a second user to access the private electronic document of the first user, via the authentication and access control module a public electronic document of the public electronic documents is provided from the public storage medium, instead of the private electronic document.

2. The method as claimed in claim 1, wherein together with the public electronic document, the previously defined degree of matching of said public electronic document is provided.

3. The method as claimed in claim 1, wherein a reference to the public electronic document together with the degree of matching for the public electronic document to the private electronic document is saved in the private storage medium via the analysis and comparison module.

4. The method as claimed in claim 1, wherein the analysis and comparison module provides the first user at a user interface with a selection of analyzed and compared public electronic documents together with the respective degree of matching and possibly the private electronic document for selection.

5. The method as claimed in claim 4, wherein an access authorization hierarchy for the second user is saved in the authentication and access control module and is shown to the first user at the user interface for individual configuration.

6. The method as claimed in claim 1, wherein the second user is provided with a selection of electronic documents from the public storage medium and/or with the respective degrees of matching.

7. The method as claimed in claim 1, wherein the degrees of matching are analyzed via the analysis and comparison module and the second user is provided with the particular electronic document of the plurality of public electronic documents from the public storage medium when the respective degree of matching of the particular electronic document lies above or below a threshold.

8. The method as claimed in claim 1, wherein the degrees of matching are analyzed via the analysis and comparison module and the second user is provided with the public electronic document with the highest degree of matching.

9. The method as claimed in claim 1, wherein the second user performs a user authentication at the authentication and access control module.

10. The method as claimed in claim 1, wherein the analysis is performed via the analysis and comparison module on the basis of guidelines for documents by image pattern recognition methods, in particular according to the ICAO guidelines for travel documents.

11. The method as claimed in claim 1, wherein the analysis is performed by the analysis and comparison module on the basis of an extended checksum formation.

12. The method as claimed in claim 1, wherein the analysis is performed by the analysis and comparison module on the basis of a formant analysis.

13. The method as claimed in claim 1, wherein iris recognition is performed by the analysis and comparison module.

14. The method as claimed in claim 1, wherein a detected movement pattern of a person is analyzed by the analysis and comparison module.

15. The method as claimed in claim 1, wherein the degree of matching is defined as a multidimensional value field.

16. The method as claimed in claim 1, wherein on the provision of the public electronic document at least one section of the public electronic document is replaced by a section of the private electronic document.

17. The method as claimed in claim 1, wherein the public electronic document is prepared in that at least one section of the private electronic document is replaced by a section of the public electronic document.

18. The method as claimed in claim 16, wherein the first user determines the at least one section in the private electronic document at a user interface of the analysis and comparison module.

19. The method as claimed in claim 16, wherein at the user interface of the analysis and comparison module the first user determines an amount of the replacement.

20. The method as claimed in claim 1, wherein the public electronic document is transferred into an intermediate storage medium of the data processing device.

21. The method as claimed in claim 1, wherein the public electronic document is transferred into the private storage medium.

22. A system for performing a method for publicly providing protected electronic documents as claimed in claim 1, the system comprising:
   a data processing device comprising an authentication and access control module, an analysis and comparison module and a private storage medium, and
   a public storage medium connected to the data processing device by data technology,
   wherein the authentication and access control module is programmed to perform a user authentication of a first user and to store at least one private electronic document from the first user in the private storage medium after successful completion of the user authentication,
   wherein in the private storage medium the at least one private electronic document is saved,
   wherein in the public storage medium a plurality of public electronic documents are saved,
   wherein the analysis and comparison module is programmed to compare and analyze the plurality of public electronic documents with the private electronic medium and to determine a degree of matching for each comparison, and
   wherein the authentication and access control module is configured so that during an attempt of a second user to access the private electronic document of the first user, a public electronic document of the plurality of public electronic documents is provided from the public storage medium to the second user.

23. The system as claimed in claim 22, wherein the private and the public storage medium are arranged in a common database system.

24. The system as claimed in claim 22, wherein the public storage medium is connected by data technology by an additional data connection via a communication network to the data processing device.

25. The system as claimed in claim 24, wherein the communication network is formed by a public data communication network, in particular by an unsecured communication network such as the internet.

26. The system as claimed in claim 22, wherein the authentication and access control module, the analysis and comparison module, and the private storage medium form a safety zone.

* * * * *